United States Patent [19]

Basile et al.

[11] Patent Number: 4,957,314
[45] Date of Patent: Sep. 18, 1990

[54] CONDUIT COUPLING ASSEMBLY

[75] Inventors: Raffaele Basile, Chicago Heights; David A. Shotts, Naperville, both of Ill.

[73] Assignee: Allied Tube & Conduit Corporation, Harvey, Ill.

[21] Appl. No.: 421,403

[22] Filed: Oct. 13, 1989

[51] Int. Cl.[5] .............................................. F16L 33/20
[52] U.S. Cl. ..................................... 285/355; 285/404
[58] Field of Search ................................ 285/355, 404

[56] References Cited

U.S. PATENT DOCUMENTS

| | | | |
|---|---|---|---|
| 30,261 | 10/1860 | Spencer . | |
| 1,366,634 | 1/1921 | Clark . | |
| 1,831,855 | 11/1931 | Fullman | 285/404 X |
| 2,230,098 | 1/1941 | Wurzburger | 285/175 |
| 2,642,312 | 6/1983 | Shine | 299/78 |
| 2,819,115 | 1/1958 | Arnold | 299/73 |
| 3,317,220 | 5/1967 | Bruning | 285/1 |
| 3,679,235 | 7/1972 | Faccou | 285/14 |
| 3,781,040 | 12/1973 | Lasko et al. | 285/404 X |
| 3,971,574 | 7/1976 | Brown | 285/404 X |
| 4,258,936 | 3/1981 | Goldberg | 285/31 |
| 4,547,004 | 10/1985 | Goldberg | 285/31 |
| 4,549,756 | 10/1985 | Basile | 285/388 |

Primary Examiner—Dave W. Arola

Attorney, Agent, or Firm—Fitch, Even, Tabin & Flannery

[57] ABSTRACT

A conduit coupling assembly for connecting the end portions of a pair of lengths of conduit in coaxial relationship. The end portions of the lengths have external threads of the same size. The coupling assembly includes an annular outer coupling member and an annular inner coupling member for reception by the outer coupling member. The outer coupling member has a first end including an internal screw thread sized for threading onto the end portion of one of the conduits. This outer member also includes a second end including an outer wall defining a cavity with the outer wall having at least one threaded aperture therethrough opening onto the cavity. The inner coupling member includes a first end and an internal screw thread sized for threading onto the end portion of the other of the conduits. The inner coupling member also has a second end sized for reception in the cavity with this inner coupling member second end having a peripheral groove on its outer surface which can be aligned with the threaded aperture. Upon reception of the inner coupling member second end in the cavity, the members can be joined by tightening a set screw located in the aperture so that the screw extends into the groove. Methods of using the coupling assembly of the present invention are also disclosed.

7 Claims, 1 Drawing Sheet

CONDUIT COUPLING ASSEMBLY

The present invention relates to couplings for conduits and pipes and, more specifically, to a coupling assembly for joining the threaded ends of a pair of lengths of conduit in coaxial relationship.

BACKGROUND OF THE INVENTION

It is a conventional practice in many types of pipe or conduit systems, and particularly in electrical systems employing tubular conduits, to connect a number of lengths of conduit in end-to-end relation through means of couplings so as to form a continuous conduit system as necessary for a particular application. In the case of thin wall conduit, which is primarily employed for encasing electrical cable or conductor wires in applications where the conduit will not be subjected to large stresses, compression fittings or couplings may be employed which are swaged or otherwise affixed to adjacent ends of conduit lengths. The conduit is generally available in different lengths, commonly 10 and 20 foot lengths, and may be quite readily formed to various bend contours and coupled end-to-end through the compression couplings.

Another type of conduit which is particularly useful in commercial and industrial applications is generally termed rigid pipe or conduit. Such conduit may, for example, range up to 2½ inches or greater in outer diameter and may have a wall thickness of 0.100 inch or greater which facilitates forming of external threads on the opposite ends of each length of conduit to enable their connection in end-to-end relation. As with thin wall conduits, the rigid pipe or conduit is also conventionally made in lengths of up to 10 to 20 feet long. Due to their relative weight, the rigid pipe lengths are not as readily manipulated during installation and are frequency installed where access is relatively limited so that rotation of the individual lengths, may be quite difficult, if not impossible.

One known technique for connecting lengths of rigid pipe or conduit in end-to-end relation is to provide generally V-shaped external pipe threads of standard size on the opposite ends of each length or section of conduit and then connect the desired number of conduit lengths in end-to-end relation through one-piece couplings having internal pipe threads therein which enable threaded connection with adjacent ends of conduit to form a structurally sound connection or coupling. A major drawback of the use of such a coupling is that it is generally required that, after installation of the coupling on one conduit length, the other relatively heavy conduit length must be lifted into alignment with the first length and then rotated to be threaded into the coupling.

One recently proposed conduit coupling assembly permits lengths of conduit to be joined quickly. Furthermore, if replacement of a component of a completed system should be required, the coupling assembly allows disassembly of the system without adjacent lengths of conduit undergoing substantial relative longitudinal movement and without any need to rotate one of the lengths of conduit. This coupling assembly includes an outer coupling having ends and a bore extending therebetween for slidably, rotatably retaining an inner abutment ring having an inner thread so that the ring can be threaded onto the end portion of one of the lengths of conduit. This threading is accomplished by using the outer coupling as, in effect, a wrench. The abutment ring has a special annular lip having a slot for receiving the inward extension of a set screw received in a threaded aperture through the outer coupling. After installation of the abutment ring, the set screw is removed or adjusted so as not to interfere with sliding of the outer coupling relative to the abutment ring. For a more complete description of this coupling assembly and its operation, reference may be made to commonly assigned U.S. Pat. No. 4,258,936 to Goldberg. Commonly assigned U.S. Pat. Nos. 4,547,004; 4,549,756 and 4,592,574 also relates to coupling assemblies including inner and outer coupling members which must both be installed on one length of conduit before the other length of conduit is brought into alignment with the one length of conduit. The lengths are subsequently joined by rotating the outer coupling to thread it onto the other length of conduit.

SUMMARY OF THE INVENTION

Among the several aspects and features of the present invention may be noted the provision of an improved coupling assembly for joining a pair of lengths of conduit. The coupling assembly permits shipping of the lengths of conduit with the outer coupling installed on one length, and the inner coupling installed on the other length so that the lengths can be initially joined in the field without relative rotation of either the conduit lengths or the coupling members. The coupling assembly offers many variations in use to enable separation of connected conduit lengths without their relative longitudinal movement, initial threading of the other length of conduit after both coupling members are held by the first length of conduit, and tightening of one or both conduit lengths on their respective coupling members (with or without rotation of the lengths of conduit) after the coupling members have been joined. The subject coupling assembly has long service life, is reliable in use, and is relatively easy and economical to manufacture. Other aspects and features of the present invention will be, in part, apparent and, in part, will be pointed out in the following specification and accompanying drawings.

Briefly, a coupling assembly embodying various aspects of the present invention includes an annular outer coupling member having a first end including an internal screw thread sized for threading onto the end portion of one of the conduits. The outer coupling member also has a second end including an outer wall defining a cylindrical cavity with the outer wall having at least one threaded aperture therethrough opening onto the cavity. The assembly also includes an annular inner coupling member with a first end and an internal screw thread sized for threading onto the end portion of the other of the conduits. The inner member also includes a second end sized for reception in the cavity with the second end having a peripheral groove on its outer surface for alignment with the threaded aperture.

As one method of using the coupling assembly, the present invention includes the following steps:

(a) The first end of the outer coupling member is installed on the end portion of one length of conduit.

(b) The inner coupling member is installed on the end portion of the other length of conduit, both installations being at an installation station.

(c) The lengths of conduit with their respective coupling members are shipped to a use location remote from the installation station.

(d) The second ends of the coupling members are brought into axial alignment.

(e) The second end of the inner coupling member is inserted in the cavity in the first coupling member until the groove is aligned with the aperture.

(f) A set screw disposed in the aperture is advanced until it engages the material defining the groove to firmly hold the coupling members joined.

As another method of using the coupling assembly, the invention includes the following steps:

(a) The first end of the outer coupling member is installed on the end portion of one length of conduit.

(b) The second end of the inner coupling member is inserted into the cavity of the first coupling member until the groove is aligned with the aperture.

(c) A set screw disposed in the aperture is advanced until it extends into the groove, but does not lock the coupling members against relative rotation.

(d) The end portion of the other of the lengths of conduit is brought into axial alignment with the inner coupling member.

(e) Relative rotation is effected between the other of the lengths of conduit and the inner coupling member to install that length of conduit in that member.

(f) The set screw is further advanced to lock the members against relative rotation.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
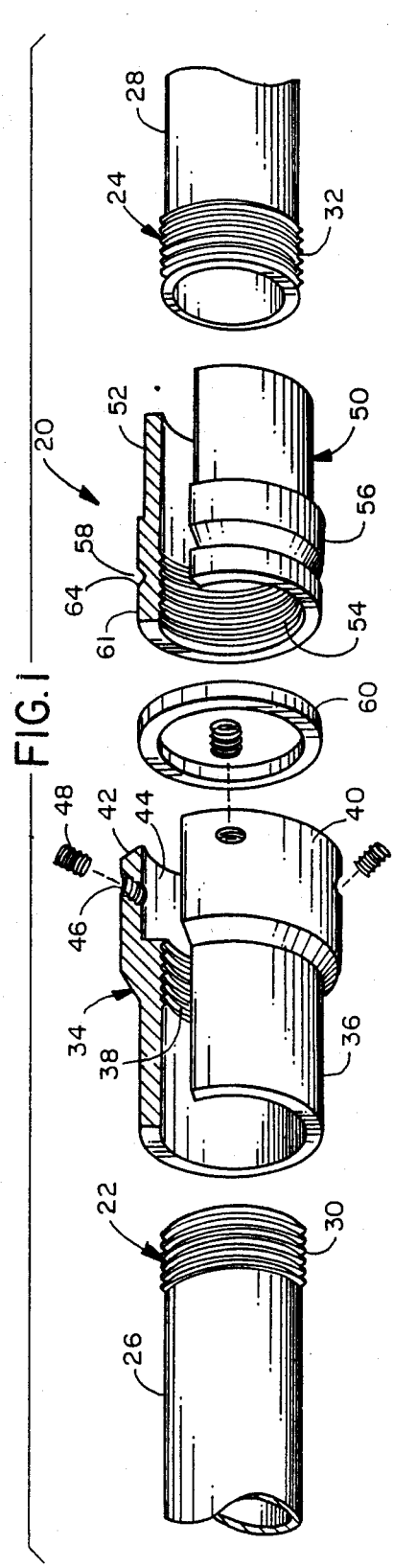
FIG. 1 is an exploded perspective of a coupling assembly embodying various aspects of the present invention, for joining the threaded ends of the two lengths of conduit.

Referring now to the drawings, a coupling assembly embodying various aspects of the present invention for connecting the end portions 22, 24 of a pair of lengths of conduit 26, 28, respectively, is designated by reference numeral 20. The lengths of conduit are preferably of the same outside diameter, and each end portion has an external thread 30, 32 of the same size. The coupling assembly 20 includes an annular outer coupling member 34 having a first end 36 having an internal screw thread 38 sized for threading onto the conduit end portion 22, and also includes a second end 40 with an outer 42 wall defining a generally cylindrical cavity 44. The outer wall 42 includes a number, preferably 2 to 4, of regularly spaced, longitudinally aligned, threaded apertures 46 therethrough opening onto the cavity 44. A set screw 48 is disposed in each aperture, and may be of the type which can be advanced using an Allen wrench or could have an extending head of square cross section for engagement by a suitable wrench.

The coupling assembly 20 also includes an annular inner coupling member 50 having a first end 52 for receiving the conduit 28. The inner coupling member 50 also has a second end 56 sized for reception in the cavity 44, and has a peripheral groove 58 on its outer surface 61 which can be aligned with the threaded apertures 46. The member 50 also has an internal screw thread 54 sized for threading onto the end portion 24 of the other length of conduit 28. Thus upon the reception of the inner coupling member second end 56 in the cavity 44, the members 34, 50 can be joined by tightening the set screws 48 causing them to extend into the groove 58.

More specifically, the internal thread 38 of the outer coupling member 34 extends to the cylindrical cavity 44 which has a diameter greater than that of the bore defined by the internal thread 38. Furthermore the internal thread 54 of the inner coupling member 50 extends the length of the member so that the conduit end portions 22, 24 can be brought into abutting relationship. However, an annular resilient seal 60 can be inserted into the cavity 44 ahead of the inner coupling member second end 56. Such a seal could be employed to prevent the entrance of water into the conduits, particularly should the conduits be used underground.

The coupling member 34 also has an inner shoulder 62. This shoulder may be located to serve as an abutment for limiting the extent of entrance of the seal. It could also be disposed to limit the extent of insertion of the second end 56 of the inner coupling member to insure that the threaded apertures 46 are in alignment with the groove 58. Each aperture 46 has an axis which converges with the axis of the outer coupling member 34 in the direction of the first end 36 of the outer coupling member at an angle of preferably between 30 and 60 degrees. Furthermore, the groove 58 is preferably V-shaped, being partially defined by an abutment surface 64. This abutment surface is angled so that it is substantially normal to the axes of the apertures so that advancement of the set screws results in the inner coupling member 50 being urged further into the cavity 44.

Figure 2:
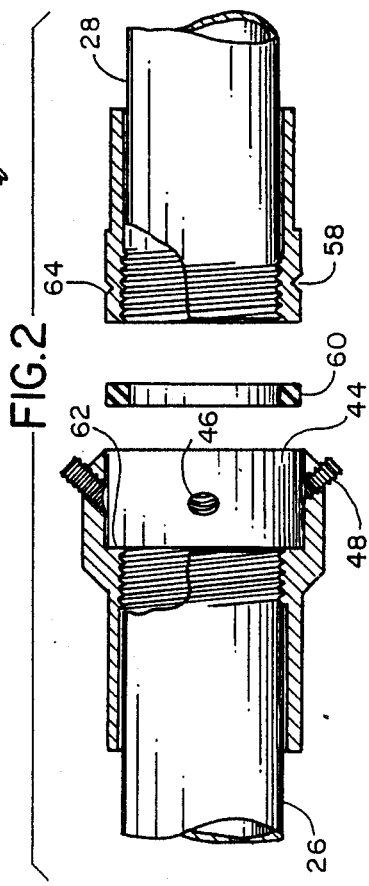
FIG. 2 is a sectional view showing an outer half of the coupling assembly threaded onto the end of one conduit, and an inner half of the coupling assembly threaded onto the end of the other conduit, before the inner and outer halves are joined.

The coupling assembly 20 offers wide variation in use. For example, the outer coupling member 34 can be applied to the end portion 22 of one length of conduit 26 at the factory or installation station and the inner coupling member 50 can similarly be applied to the end portion 24 of the second length of conduit 28 at the factory. The lengths with the coupling members attached may then be shipped to a use location so that the installer merely need align the two lengths of conduit (as shown in FIG. 2), and move the second end 56 of the inner coupling member 50 into the cavity 44 so that the set screws 48 can be advanced to lock the coupling together.

Figure 3:
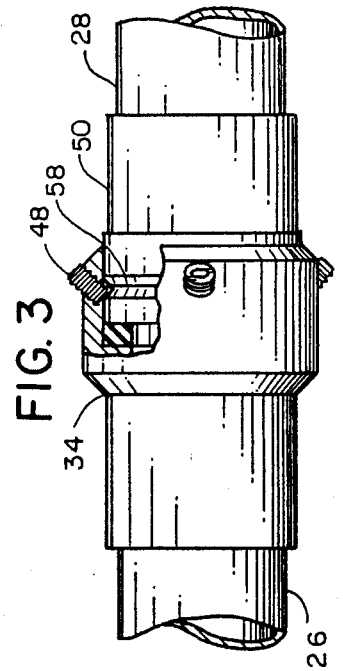
FIG. 3 is a sectional view depicting the coupling assembly joining the two lengths of conduit in coaxial relationship.
Figure 4:
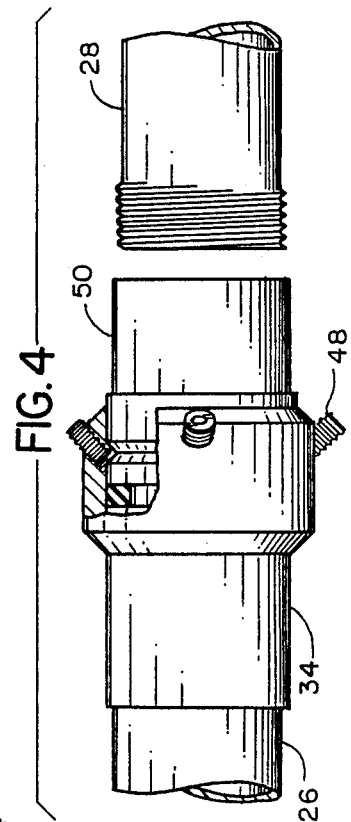
FIG. 4, similar to FIG. 2, illustrates the coupling outer half tightened on the end of one conduit and loosely rotatably holding the coupling inner half, before the inner half is threaded onto the end of the other length of pipe.

Additionally, after the outer coupling member 34 is installed on the end portion of the first length of conduit 26, the inner coupling member can be inserted into the cavity and the set screws advanced so that the screws extend into the groove but do not engage the material defining the groove (as shown in FIG. 4), so that the inner coupling member 50 can be rotated with respect to the outer coupling member 34. Thereafter, the second length of conduit 28 can be aligned and the inner coupling member rotated to be thread onto the second length of conduit. After the two coupling members are rotated to sufficiently tighten the conduits, the set screws 48 can be advanced to lock the two coupling members together so that they will not rotate relative to each other (as shown in FIG. 3).

In the event that a length of conduit is damaged after the initial installation and requires replacement, the inner and outer coupling members can be backed off sufficiently to expose the ends of the lengths of conduit, assuming sufficient thread on the conduit. This allows disassembly and replacement of the damaged length of conduit without relative longitudinal movement of the adjacent lengths of conduit thereby facilitating replacement of a damaged conduit without wholesale disassembly of the installed conduit system.

One method of using the coupling assembly 20 of the invention includes the following steps:

(a) The outer coupling member is installed on the end portion of one length of conduit at an installation station.

(b) The inner coupling member is installed on the end portion of the other length of conduit at the installation station.

(c) The lengths of the conduit with their respective coupling members are shipped to a use location remote from the installation station.

(d) The second ends of the coupling members are brought into axial alignment.

(e) The second end 56 of the inner coupling member 50 is inserted into the cavity 44 of the outer coupling member 34 until the groove is aligned with the apertures.

(f) The set screws 48 are advanced until they engage the material defining the groove 58 to firmly hold the coupling members together.

As another method of using the conduit coupling assembly 20, the invention includes the following steps:

(a) The first end 36 of the outer coupling member 34 is installed on the end portion 22 of one length of conduit 26.

(b) The second end 56 of the inner coupling member 50 is inserted into the cavity 44 of the first coupling member until the groove 58 is aligned with the apertures 46.

(c) The set screws 48 disposed in the apertures are advanced until they extend into the groove but do not lock the coupling members against relative rotation.

(d) The end portion 24 of the other of the lengths of conduit is brought into alignment with the inner coupling member.

(e) Relative rotation between the other of the lengths of the conduit and the inner coupling member causes that length of conduit to be installed in the inner coupling member.

(f) The set screws 48 are further advanced to lock the coupling members against relative rotation.

In view of the above, it will be seen that the several objects of the invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. A conduit coupling assembly for connecting the end portions of a pair of lengths of metallic tubular conduit or the like of substantially the same outside diameter in coaxial relationship, said end portions each having external threads of the same size, said coupling assembly comprising:

an outer coupling member, annular throughout its length, having a first end including an internal screw thread sized for threading onto the end portion of one of the conduits, said outer coupling member also having a second end including an outer wall defining a cylindrical cavity, said outer wall having at least one threaded aperture therethrough opening onto said cavity; and an annular inner coupling member having a first end for receiving said other conduit, said inner coupling member also having a second end sized for reception in said cavity and an internal screw thread sized for threading onto the end portion of the other of the conduits, said inner coupling member second end having a peripheral groove on its outer surface which can be aligned with said threaded aperture whereby upon reception of the inner coupling member second end in said cavity, said members can be joined by tightening a set screw disposed in said aperture so that said screw extends into said groove, said inner coupling member second end having a length substantially equal to the length of said cavity so that when said members are joined, said inner coupling first end extends beyond said outer coupling.

2. A coupling assembly as set forth in claim 1 wherein said outer coupling member includes an inner shoulder limiting insertion of said inner coupling member second end into said cavity so that said groove is in alignment with said aperture.

3. A coupling assembly as set forth in claim 1 wherein the internal screw thread of said outer coupling member extends to said cavity, and wherein the internal screw thread of said inner coupling member extends the length of that member whereby the end portions of said conduits can be brought into abutting relationship.

4. A coupling assembly as set forth in claim 1 wherein said outer wall has a plurality of the threaded apertures which are regularly spaced, said groove being alignable concurrently with all of said apertures.

5. A coupling assembly as set forth in claim 1 further comprising an annular resilient seal disposed in said cavity.

6. A coupling assembly as set forth in claim 1 wherein said aperture has an axis which converges with the axis of said outer coupling member in the direction of the first end of said outer coupling member at an angle of between 30 and 60 degrees, said groove including an abutment surface disposed substantially normal to the axis of said aperture whereby advancement of the set screw urges said inner coupling member further into said cavity to simultaneously tighten the coupling and lock the inner coupling member from rotation within said outer coupling member.

7. A conduit assembly comprising:

a first length of metallic tubular conduit having an end portion with an external thread;

a second length of metallic tubular conduit of substantially the same outside diameter as said first length, said second length having an end portion having an external thread of the same size as the aforementioned external thread; and a conduit coupling assembly connecting said end portions to hold said lengths in at least closely adjacent, coaxial relationship, said conduit coupling assembly comprising:

an outer coupling member, annular throughout its length, having a first end including an internal screw thread threaded onto the end portion of said first length, said outer coupling member also having a second end including an outer wall defining a cylindrical cavity, said outer wall having at least one threaded aperture therethrough opening onto said cavity; and an annular inner coupling member having a first end receiving said other conduit, said inner coupling member also having a second end received in said cavity and an internal screw thread threaded onto the end portion of said second length, said inner coupling member second end having a peripheral groove on its outer surface aligned with said threaded aperture, said outer coupling member further including a set screw disposed in said aperture and extending into said groove, said inner coupling member second end having a length substantially equal to the length of said cavity so that the inner coupling first end extends beyond said outer coupling.

* * * * *